United States Patent
Yamada et al.

(10) Patent No.: US 7,000,068 B2
(45) Date of Patent: Feb. 14, 2006

(54) RECORDING AND PLAYBACK APPARATUS AND RECORDING AND PLAYBACK METHOD

(75) Inventors: Masaki Yamada, Kanagawa (JP); Nobuhisa Toshitani, Chiba (JP); Masayuki Hoshi, Tokyo (JP)

(73) Assignee: Sony Corporation, Tokyo (JP)

(*) Notice: Subject to any disclaimer, the term of this patent is extended or adjusted under 35 U.S.C. 154(b) by 131 days.

(21) Appl. No.: 10/285,763

(22) Filed: Nov. 1, 2002

(65) Prior Publication Data

US 2003/0115409 A1  Jun. 19, 2003

(30) Foreign Application Priority Data

Nov. 2, 2001  (JP) .............................. 2001-338278

(51) Int. Cl.
*G06F 12/00*  (2006.01)
(52) U.S. Cl. ..................... 711/113; 711/4; 711/100; 711/111; 711/150
(58) Field of Classification Search ............... 711/111, 711/112, 113
See application file for complete search history.

(56) References Cited

U.S. PATENT DOCUMENTS 6,340,973 B1 * 1/2002 Ochiai et al. ............... 345/534
6,502,106 B1 * 12/2002 Gampper et al. ........ 707/104.1

* cited by examiner

Primary Examiner—Mano Padmanabhan
Assistant Examiner—Midys Rojas
(74) Attorney, Agent, or Firm—Frommer Lawrence & Haug LLP; William S. Frommer; Samuel S. Lee

(57) ABSTRACT

A schedule-controlling unit selects a file whose remaining time for playback is the shortest among files to be restored and compares the remaining time for playback of the selected file with a reference time set in advance. When the remaining time for playback is longer than the reference time, the schedule-controlling unit again selects a file in which a distance parameter of a partition of unrestored data to be subsequently restored is the lowest among files to be restored. A restoring unit restores unrestored data of one partition of the file selected by the schedule-controlling unit.

12 Claims, 15 Drawing Sheets

FIG. 7A
VIDEO FILE FA 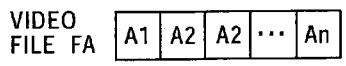
VIDEO FILE FB 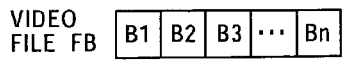
VIDEO FILE FC 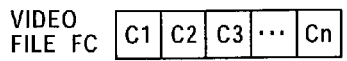
FIG. 7B
HARD DISK 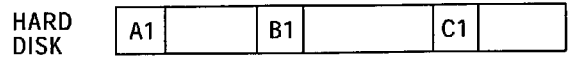
MAGNETIC TAPE #1
MAGNETIC TAPE #2
MAGNETIC TAPE #3
FIG. 7C
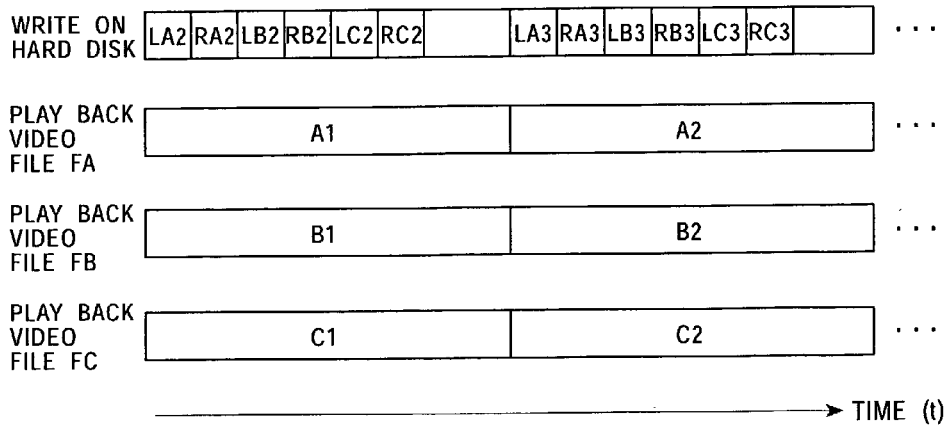

51

| FILE NUMBER | TYPE OF TRANSFER REQUEST |
|---|---|
| 10 | RESTORE |
| 17 | RESTORE |
| 91 | RESTORE |
| 100 | BACKUP |

PLAYBACK ALLOWANCE TIME (sec) = CAPACITY OF PLAYBACK ALLOWANCE REGION (MB)*8/REAL-TIME SPEED (Mbps)

| FILE NUMBER | BLOCK NUMBER INDICATED BY PLAYBACK POINTER Po1 | BLOCK NUMBER INDICATED BY PLAYBACK POINTER Po2 |
|---|---|---|
| 10 | 1234 | 2345 |
| 17 | 0 | 5678 |
| 92 | - - - - | - - - - |

| PARTITION NUMBER | SUBSEQUENT PARTITION NUMBER |
|---|---|
| 0 | 1 |
| 1 | 2 |
| 2 | −1 |
| 3 | 10 |
| 4 | 15 |
| - - - - | - - - - |
| 5099 | −2 |

FIG. 14
MAGNETIC TAPE #1 (LOADED IN TAPE DRIVE UNIT 20)
CURRENT POSITION P1
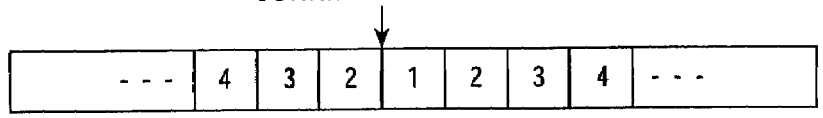
MAGNETIC TAPE #2 (NOT LOADED IN TAPE DRIVE UNIT 20)
UNLOAD POSITION P2
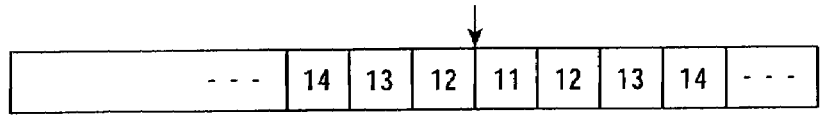
FIG. 15
73
| MAGNETIC TAPE NUMBER | PARTITION NUMBER OF INDICATED BY UNLOAD POSITION P2 |
|---|---|
| 1 | −1 |
| 2 | 11 |
| --- | --- |
| 20 | 200 |

RECORDING AND PLAYBACK APPARATUS AND RECORDING AND PLAYBACK METHOD

BACKGROUND OF THE INVENTION

1. Field of the Invention

The present invention relates to a recording and playback apparatus and a recording and playback method. More specifically, the present invention relates to a recording and playback apparatus which is suitable for recording and/or playing back a plurality of large capacity and real-time data files and to a recording and playback method.

2. Description of the Related Art

In recent years, video files of movies and so on have been recorded as video data in recording media by using a tape drive (tape streamer drive) or a hard disk drive. As recording media used for the tape drive, a magnetic tape having a recording capacity of several tens of giga bytes can be used.

In a tape drive, a file is recorded and played back by sequentially accessing a magnetic tape, and thus it takes time to perform search and to find the beginning of a file. Therefore, the tape drive is not suitable for recording and playing back data, particularly video files, which must be immediately accessed. Also, when the tape drive plays back a plurality of files written on one magnetic tape, the tape drive can play back only one file at a time.

On the other hand, a random access can be realized in a hard disk device, and thus recording and playback can be performed immediately. Further, the hard disk device can play back a plurality of files at the same time. However, the price per recording capacity of the hard disk device is higher than that of a magnetic tape. Thus, the hard disk device has generally a small recording capacity and is not suitable for recording video files having a large capacity.

The applicant of the present invention has proposed a high-capacity storage system formed by combining a hard disk device and a tape drive, which is disclosed in Japanese Unexamined Patent Application Publication No. 2000-283563. However, this system cannot record and/or play back a plurality of files immediately.

SUMMARY OF THE INVENTION

Accordingly, the present invention has been made in view of the above-described states, and it is an object of the present invention to provide a recording and playback apparatus for immediately recording and/or playing back a plurality of large-capacity and real-time data files and to provide a recording and playback method.

In order to solve the above-described problems, a recording and playback apparatus according to the present invention comprises: a magnetic tape drive unit for reading/writing a data file including a plurality of data in units of recording regions which are formed by dividing a magnetic tape in each of a plurality of tape cartridges, each recording region having a predetermined capacity; a tape cartridge changing unit for accommodating the plurality of tape cartridges, selecting a specific tape cartridge from among the plurality of tape cartridges, and conveying the selected tape cartridge to the magnetic tape drive unit; a hard disk drive unit including a hard disk having at least a cache area which is used when the magnetic tape drive unit reads/writes the data file; and a control unit including at least a schedule-controlling unit which selects a data file whose remaining time for playback is the shortest when a plurality of different data files on the magnetic tapes in the plurality of tape cartridges are played back while the data files are sequentially written on the cache area of the hard disk, the remaining time for playback being calculated based on a currently played back position and a writing end position in the cache area on which data of a predetermined number of recording regions is written.

According to the recording and playback apparatus, by calculating the remaining time for playback of the plurality of different data files read from the plurality of magnetic tapes in the plurality of tape cartridges, selecting a data file whose remaining time for playback is the shortest, and playing back the data files in order from the data file whose remaining time for playback is the shortest, a plurality of video files can be simultaneously and continuously played back.

Also, the present invention provides a recording and playback method using a recording and playback apparatus comprising a magnetic tape drive unit for reading/writing a data file including a plurality of data in units of recording regions which are formed by dividing a magnetic tape in each of a plurality of tape cartridges, each recording region having a predetermined capacity; a tape cartridge changing unit for accommodating the plurality of tape cartridges, selecting a specific tape cartridge from among the plurality of tape cartridges, and conveying the selected tape cartridge to the magnetic tape drive unit; and a hard disk drive unit including a hard disk having at least a cache area which is used when the magnetic tape drive unit reads/writes the data file. The method comprises selecting a data file whose remaining time for playback is the shortest when a plurality of different data files on the magnetic tapes in the plurality of tape cartridges are played back while the data files are sequentially written on the cache area of the hard disk, the remaining time for playback being calculated based on a currently played back position and a writing end position in the cache area on which data of a predetermined number of recording regions is written.

According to the recording and playback method, by calculating the remaining time for playback of the plurality of different data files read from the plurality of magnetic tapes in the plurality of tape cartridges, selecting a data file whose remaining time for playback is the shortest, and playing back the data files in order from the data file whose remaining time for playback is the shortest, a plurality of video files can be simultaneously and continuously played back.

BRIEF DESCRIPTION OF THE DRAWINGS

FIGS. 7A to 7C illustrate simultaneous playback of a plurality of different video files performed by the server, in which FIG. 7A shows the configuration of video files, FIG. 7B shows that the video files are written on a hard disk and magnetic tapes, and FIG. 7C is a time chart of simultaneous playback of the video files;

FIG. 12 is a remaining time for playback calculation table stored in the memory provided in the server;

FIG. 13 is a partition access table stored in a file system management region in a hard disk in an HDD unit provided in the server;

FIG. 14 illustrates a distance parameter used when the server decides the priority of a file;

FIG. 15 is an unload position table stored in the file system management region in the hard disk in the HDD unit provided in the server;

DESCRIPTION OF THE PREFERRED EMBODIMENTS

Hereinafter, embodiments of a recording and playback apparatus and a recording and playback method of the present invention will be described in detail with reference to the drawings.

Figure 1:
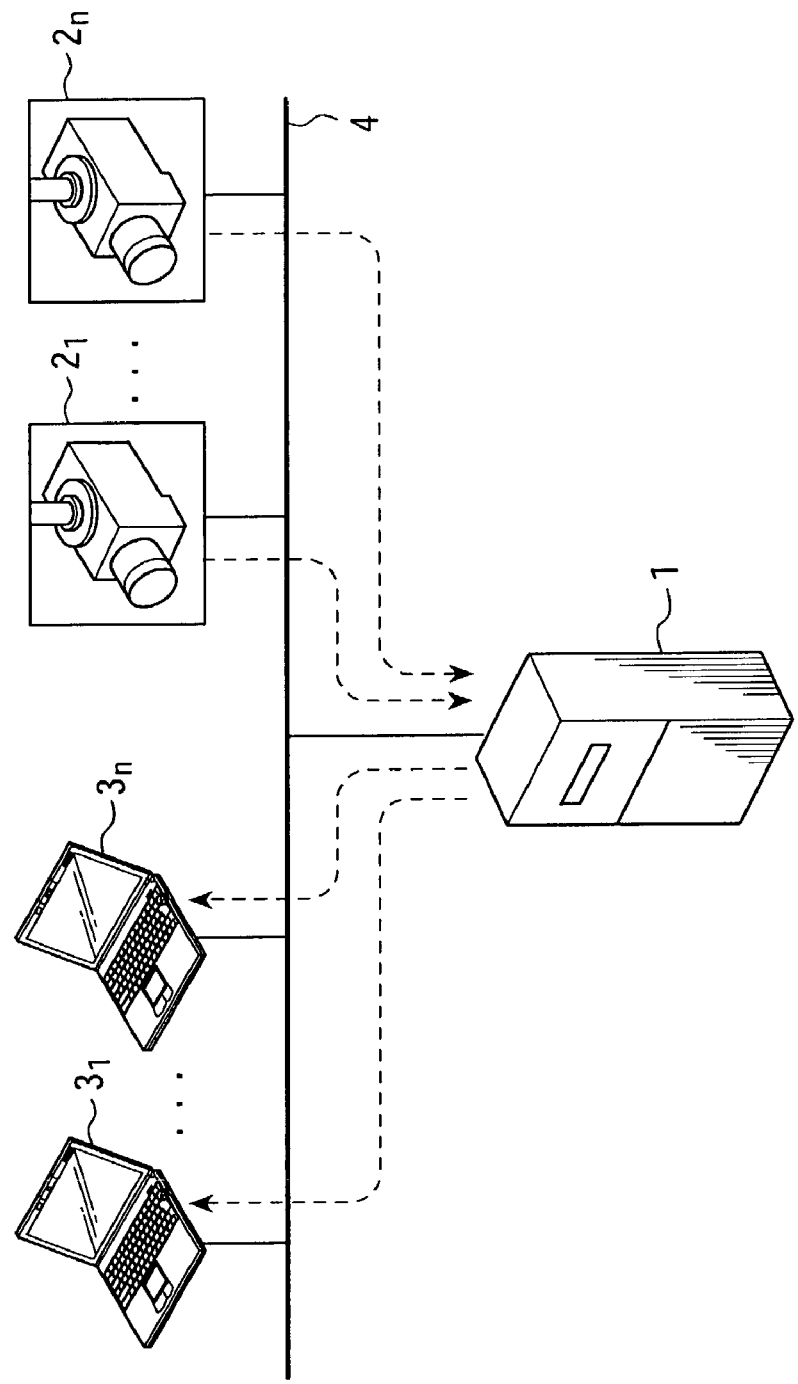
FIG. 1 shows the overall system including a server according to an embodiment of the present invention.

FIG. 1 shows the overall system using a server 1 as an example to which the recording and playback apparatus of the present invention is applied. The system includes the server 1, a plurality of client recording apparatuses $2_1$ to $2_n$, and a plurality of client playback apparatuses $3_1$ to $3_n$, which are connected by using an Ethernet® network 4. Hereinafter, when the plurality of client recording apparatuses $2_1$ to $2_n$ and the plurality of client playback apparatuses $3_1$ to $3_n$ do not need to be distinguished from each other, they will be mentioned as just a client recording apparatus 2 and a client playback apparatus 3.

The client recording apparatus 2 is, for example, a digital video camera or a computer terminal which can receive a television signal. The client recording apparatus 2 digitalizes videos and sounds by compressing them with a moving picture experts group (MPEG) format and supplies a generated digital file (hereinafter, referred to as a file) to the server 1 through the Ethernet network 4.

The server 1 records the file supplied from the client recording apparatus 2 through the Ethernet network 4 and supplies the file to the client playback apparatus 3 in response to a request from the client playback apparatus 3. Also, the server 1, whose hardware configuration will be described later with reference to FIG. 2, includes a hard disk drive (HDD) unit and a tape library unit, and serves as a hierarchical storage system (HSM) realized by combining a plurality of different storages, that is, a hard disk and a tape cartridge. The server 1 may include a plurality of HDD units.

The client playback apparatus 3 is a general computer terminal. The client playback apparatus 3 requests the server 1 through the Ethernet network 4 to supply a file, expands the file to generate analog data, and displays video on a display or outputs sound through a speaker.

The Ethernet network 4 is a local area network (LAN) compliant with Institute of Electrical and Electronics Engineers (IEEE) 802.3. Also, a wireless LAN network compliant with IEEE 802.11 or a wired network compliant with Home Phoneline Networking Alliance (HomePNA) using a telephone line may be used.

Figure 2:
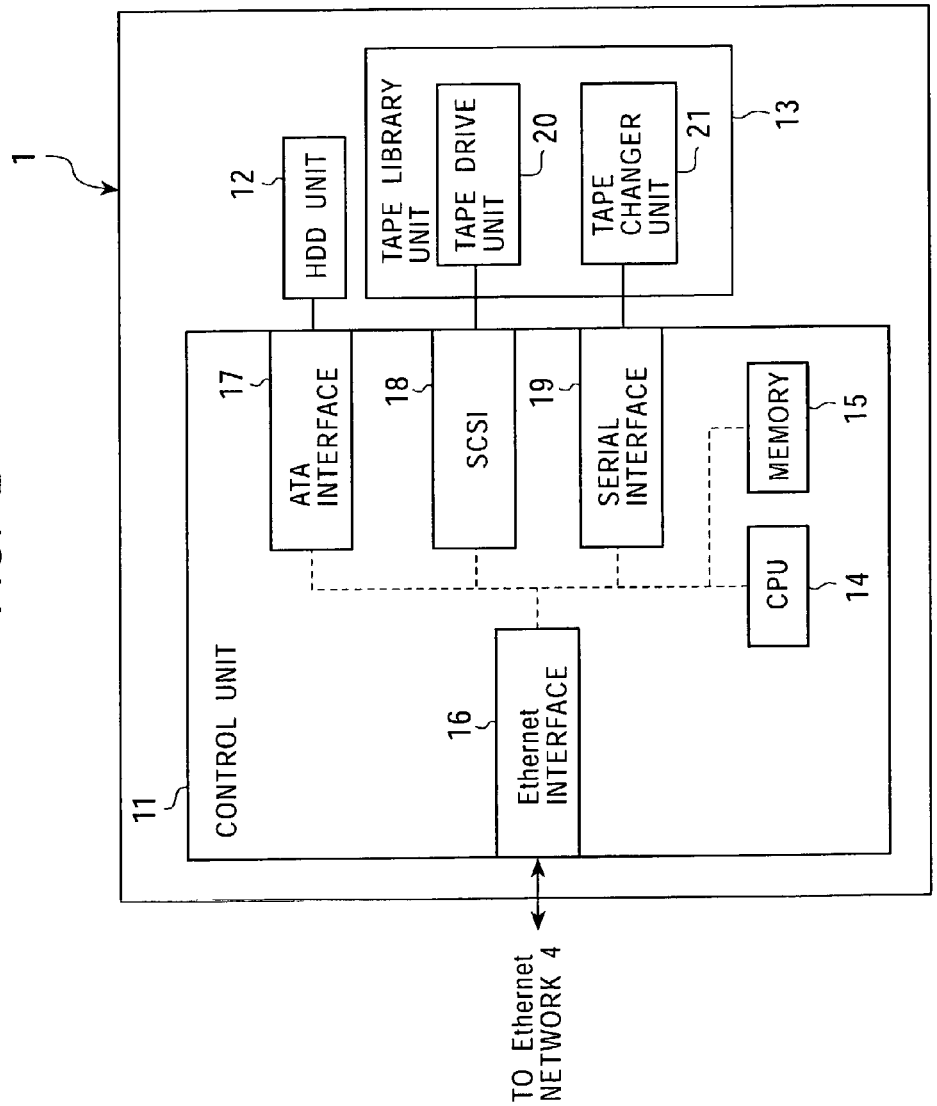
FIG. 2 is a block diagram showing the hardware configuration of the server.

Now, the hardware configuration of the server 1 will be described with reference to FIG. 2. The server 1 includes at least a control unit 11, an HDD unit 12, and a tape library unit 13. The control unit 11 is formed by mounting a central processing unit (CPU) 14, a memory 15, an Ethernet interface 16, an AT attachment (ATA) interface 17, a small computer system interface (SCSI) 18, and a serial interface 19 on a motherboard. The tape library unit 13 includes a tape drive unit 20 and a tape changer unit 21.

Next, each of the above-described units will be described. The CPU 14 performs various controls of the server 1. The memory 15 is a working area used when the CPU 14 operates. The Ethernet interface 16 is used as an input/output unit between the control unit 11 and the Ethernet network 4. The ATA interface 17 is an input/output unit between the control unit 11 and the HDD unit 12. The SCSI 18 is an input/output unit between the control unit 11 and the tape drive unit 20 of the tape library unit 13. The serial interface 19 is, for example, an RS-232C, and is an input/output unit between the control unit 11 and the tape changer unit 21 of the tape library unit 13.

The HDD unit 12 includes a hard disk (not shown) having a recording capacity of several tens of giga bytes. A plurality of areas are formed in this hard disk, for example, a cache area which is used when the data of files sequentially supplied from the client recording apparatus 2 through the Ethernet network 4 is written on a magnetic tape in a tape cartridge (not shown) loaded in the tape drive unit 20 or when the data of the file written on the magnetic tape is read, and a file system management area which is used to manage a file system, which will be described later with reference to FIG. 4. Also, depending on the situation, the file supplied from the client recording apparatus 2 may be stored in only the hard disk or the magnetic tape.

The tape drive unit 20 is, for example, an advanced intelligent tape (AIT) 2 tape streamer drive. The tape drive unit 20 can read/write a file by using a recording medium, which is a magnetic tape in a tape cartridge loaded by the tape changer unit 21. Specifically, the tape drive unit 20 writes the data of a file stored in the cache area formed in the hard disk in the HDD unit 12 on the magnetic tape, and outputs the data written on the magnetic tape to the cache area of the hard disk.

The tape changer unit 21 includes at least a rack unit (not shown) for accommodating a plurality of, for example, twenty tape cartridges; and a robotics unit (not shown) which selects a specific tape cartridge to which data is read/written and conveys the tape cartridge to the tape drive unit 20.

In the server 1, each of the magnetic tapes in the twenty tape cartridges is not an independent recording medium, but the twenty magnetic tapes are regarded as a single magnetic tape. That is, the server 1 can be regarded as an apparatus including a recording medium having a recording capacity corresponding to the hard disk in the HDD unit 12 and the twenty magnetic tapes accommodated in the rack unit of the tape changer unit 21.

Figure 3:
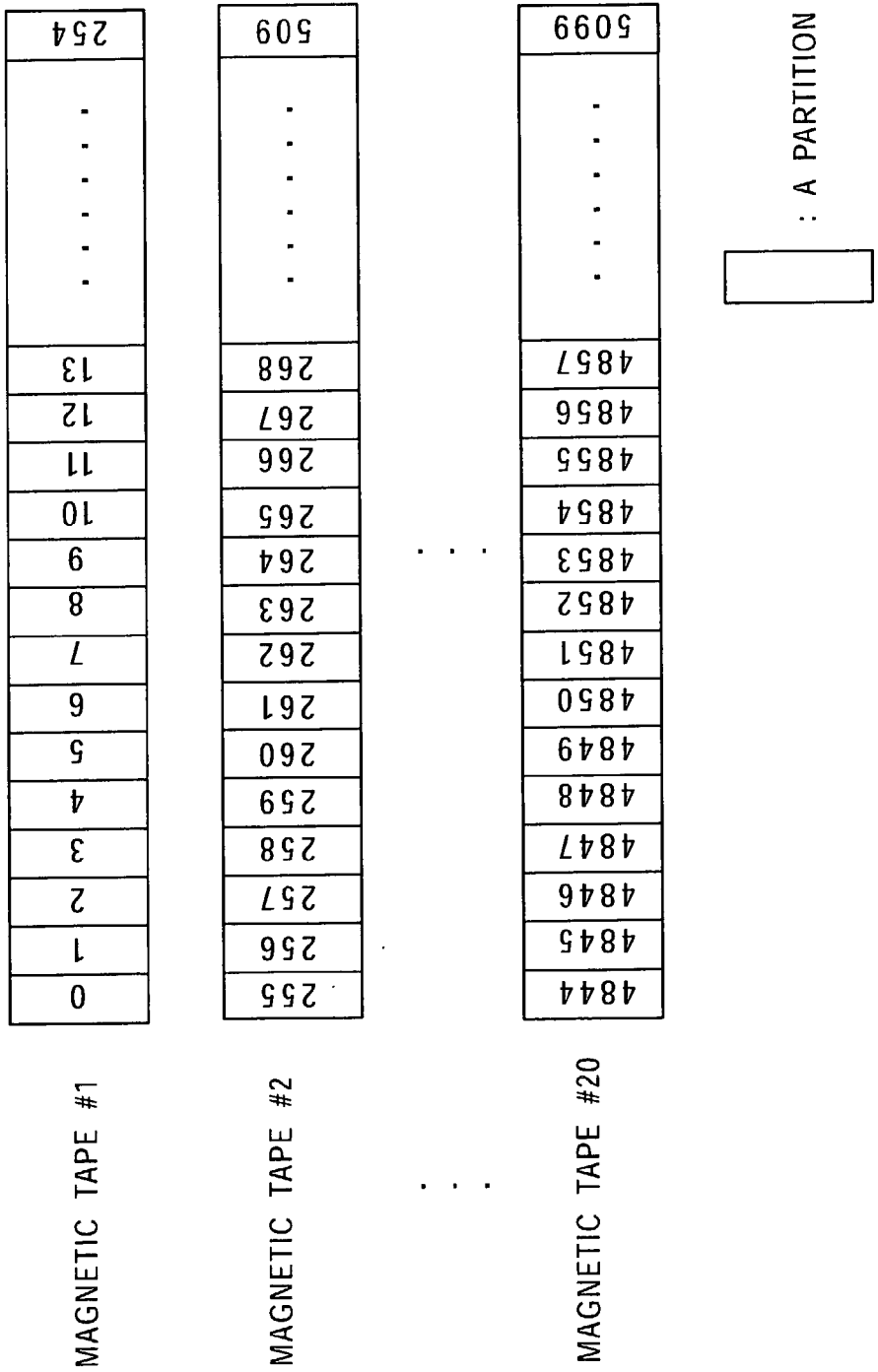
FIG. 3 shows the layout of magnetic tapes used as one recording medium in the server.

Next, the layout of the magnetic tape in each tape cartridge will be described with reference to FIG. 3. Generally, on a magnetic tape, a partial overwriting cannot be performed to the data which is previously written, because a magnetic tape is sequentially accessed. However, the tape drive unit 20 is an AIT 2 tape streamer drive having a multi-partition function. As shown in FIG. 3, each of the magnetic tapes #1 to #20 corresponding to the twenty tape cartridges is divided into partitions, each of which is a predetermined unit of recording region, and data is read/written in units of partition. Therefore, overwriting can be performed. Each of the magnetic tapes is divided into, for example, 255 partitions, and is managed. The tape drive unit 20 does not need to perform a preformat operation in advance for the multi-partitions, and performs writing while formatting so as to add necessary partitions when writing is performed for the first time.

Since the magnetic tapes in the twenty tape cartridges are regarded as one magnetic tape in the server 1, the partitions of the magnetic tapes #1 to #20 are sequentially numbered #0, #1, #2, . . . , and #5099 (255×20) so as to be managed.

The recording capacity of each magnetic tape is about 50 GB when the magnetic tape is not divided into a plurality of partitions. Thus, the recording capacity of the twenty magnetic tapes is about 1 TB. However, when the magnetic tape is divided into a plurality of partitions, overheads (gaps) are generated between the partitions, and thus an effective recording capacity of each magnetic tape is less than 50 GB.

For example, the recording capacity of each partition is about 160 MG. In this case, when a 60-minute video file which is compressed with MPEG 2 format of 4 Mbps is written on a magnetic tape, the required capacity is 1800 MB (4 Mbps ×60 min×60 sec×⅛), and thus twelve partitions are used.

Hereinafter, when the magnetic tapes #1 to #20 or the partitions #0 to #5099 do not need to be distinguished from each other, they will be mentioned as just a magnetic tape or a partition.

Figure 4:
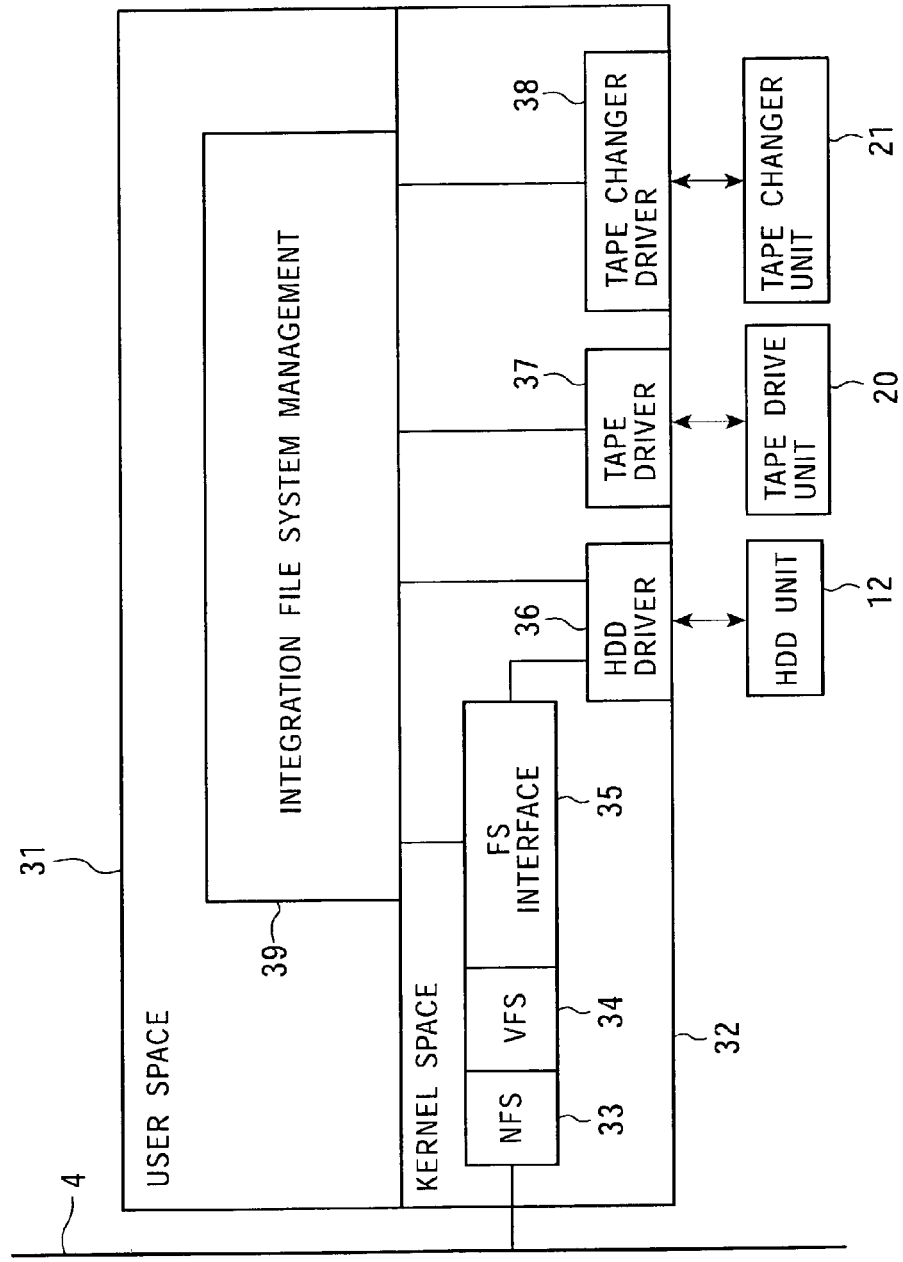
FIG. 4 is a block diagram showing the software configuration of a control program for controlling the server.

Next, the software configuration of a control program for controlling the server 1 will be described with reference to FIG. 4. The server 1 uses a so-called Linux as a basic program (hereinafter, referred to as operating system (OS)).

The software configuration of this control program is formed by adding software blocks including a file system (FS) interface 35, an HDD driver 36, a tape driver 37, a tape changer driver 38, and an integration file system management 39, which will be described later, to the Linux.

That is, in the control program, a kernel space 31 which is the most basic part of the Linux function includes a so-called network file system (NFS) 33, a virtual file system (VFS) 34, the FS interface 35, the HDD driver 36, the tape driver 37, and the tape changer driver 38. Also, a user space 32 includes the integration file system management 39. Herein, the file system is a part of the OS which manages files in the hard disk and which controls reading/writing.

The NFS 33 is a software block provided so that the hard disk in the server 1 connected to the Ethernet network 4 is used as the hard disk of the client playback apparatus 3.

The VFS 34 is a virtual file system for supporting a plurality of file systems (not shown).

The FS interface 35 is a software block serving as an interface for the VFS 34, the HDD driver 36, and the integration file system management 39.

The HDD driver 36, the tape driver 37, and the tape changer driver 38 are software blocks for operating the HDD unit 12, the tape drive unit 20, and the tape changer unit 21, respectively.

The integration file system management 39 is a system for integrally managing the files in the server 1 on the Linux used as an OS, and is an application software block for controlling the HDD driver 36, the tape driver 37, and the tape changer driver 38 so as to control the operation of the HDD unit 12, the tape drive unit 20, and the tape changer unit 21 for realizing the management.

Figure 5:
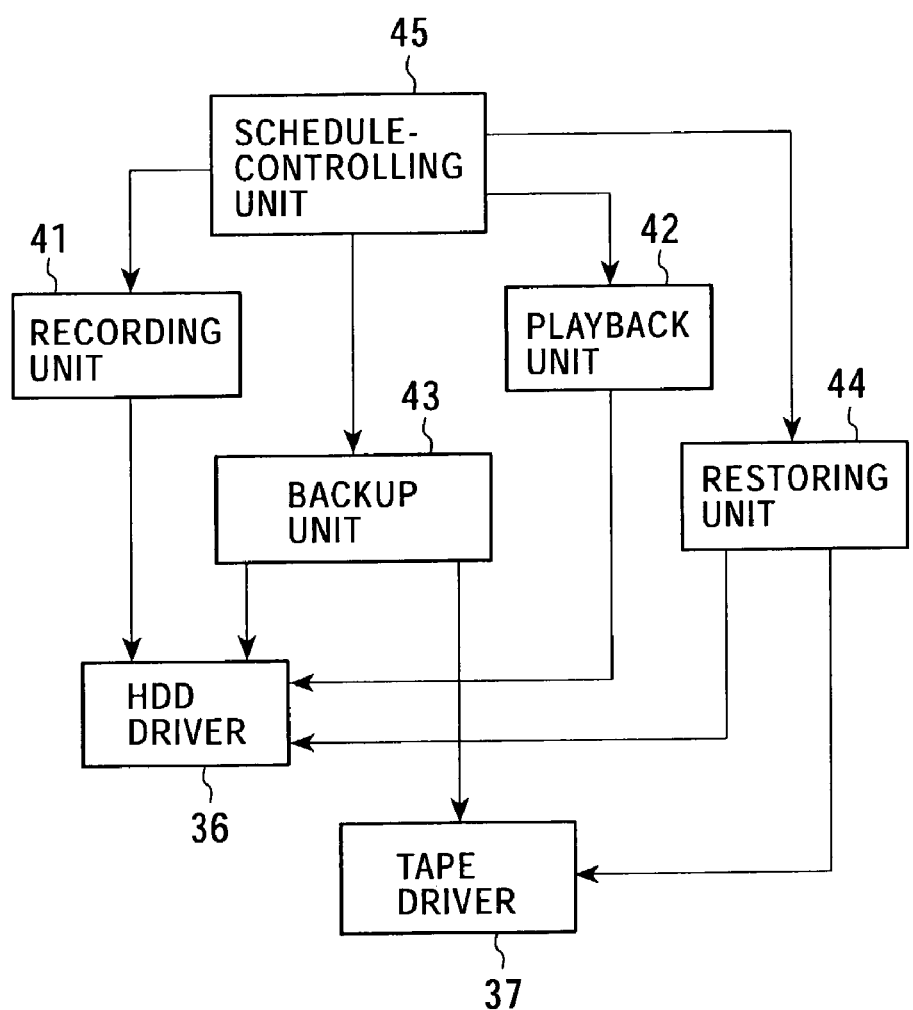
FIG. 5 shows a functional block of an integration file system management in the control program.

The function of the integration file system management 39 will be described in detail with reference to a functional block shown in FIG. 5. The integration file system management 39 as a functional block includes at least a recording unit 41, a playback unit 42, a backup unit 43, a restoring unit 44, and a schedule-controlling unit 45.

The recording unit 41 stores the data supplied from the client recording apparatus 2 through the Ethernet network 4 in the cache area of the hard disk in the HDD unit 12. Also, as described later in detail, the recording unit 41 registers a request for transferring the data from the hard disk to the magnetic tape on the schedule-controlling unit 45.

The playback unit 42 supplies the data stored in the cache area of the hard disk in the HDD unit 12 to the client playback apparatus 3 through the Ethernet network 4. Also, as described later in detail, the playback unit 42 registers a request for transferring the data from the magnetic tape to the hard disk on the schedule-controlling unit 45.

The backup unit 43 sequentially transfers the data of the file stored in the cache area of the hard disk in the HDD unit 12 to the partitions of the magnetic tape. Transferring a file from the hard disk to the magnetic tape refers to backup.

The restoring unit 44 transfers the data of the file written on the partitions of the magnetic tape to the cache area of the hard disk in the HDD unit 12. Transferring data from the magnetic tape to the hard disk refers to restoring.

The schedule-controlling unit 45 controls the schedule of each of the above-described units so that files are continuously supplied from the client recording apparatus 2 to the server 1 and from the server 1 to the client playback apparatus 3.

Figure 6:
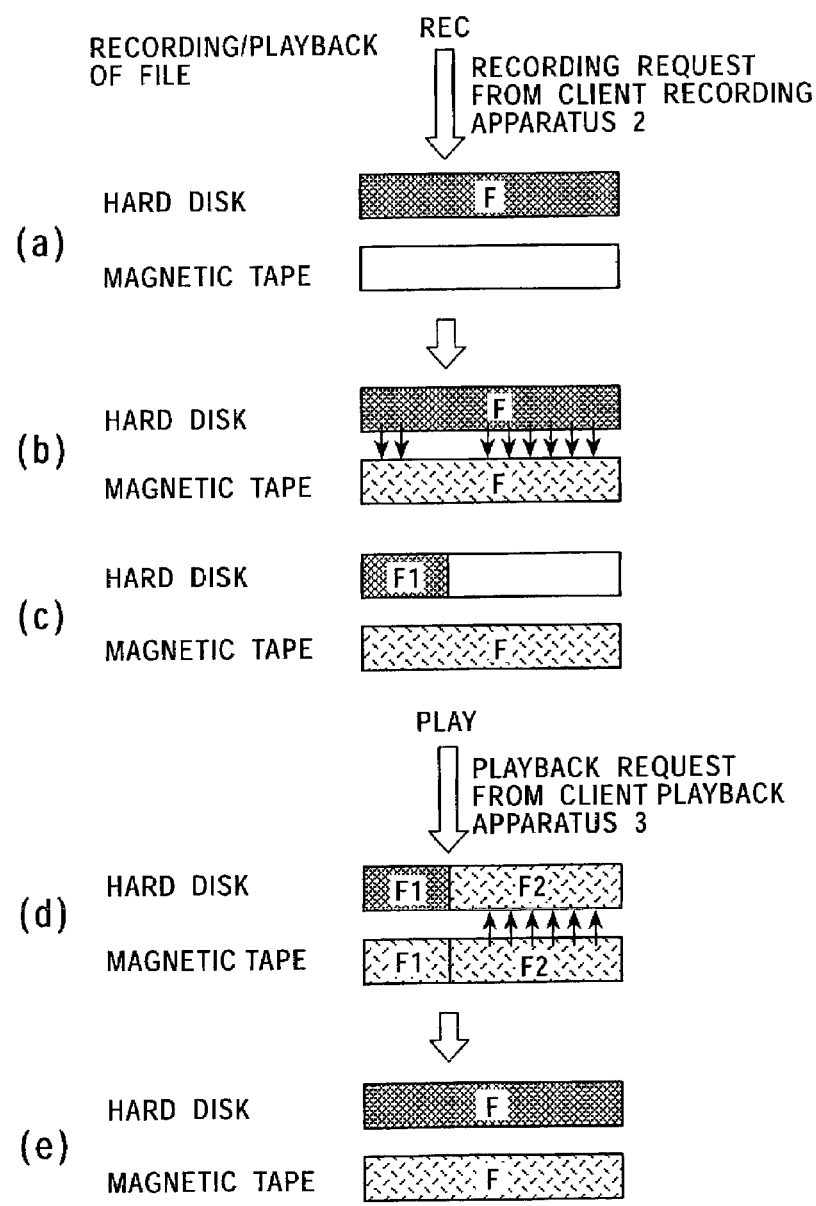
FIG. 6 illustrates the flow when the server records/plays back a file.

Next, the outline of a process of recording/playing back a file performed by the server 1 will be described with reference to FIG. 6. In each of (a) to (e) of FIG. 6, the upper stage indicates the capacity of a file F stored in the cache area of the hard disk in the HDD unit 12, and the lower stage indicates the capacity of the file F written on the magnetic tape.

First, as shown in (a), the server 1 stores the entire file F supplied from the client recording apparatus 2 in the cache area of the hard disk.

Next, as shown in (b), the server 1 backs up the entire file F stored in the cache area of the hard disk to the magnetic tape.

Then, when a predetermined condition is satisfied, for example, when a predetermined time has passed, as shown in (c), the server 1 leaves the head part F1 of the file F in the cache area of the hard disk and deletes the remainder. Accordingly, when a playback request from the client playback apparatus 3 is input to the server 1, the server 1 can play back the file F without keeping the user waiting by accessing a high-speed hard disk instead of accessing a magnetic tape, which needs relatively more time to access. Otherwise, the server 1 cannot play back the file F until the magnetic tape is moved to the position where the head part F1 of the file F is recorded so as to start reading, and thus the user is kept waiting.

After the playback request from the client playback apparatus 3 is input, as shown in (d), the server 1 immediately starts playing back from the head part F1 of the file F, which is left in the cache area of the hard disk. Meanwhile, the server 1 moves the magnetic tape to the position where the subsequent part F2 of the head part F1 is recorded so as to start reading, and restores the data to the cache area of the hard disk.

Accordingly, as shown in (e), the entire file F is stored in the cache area of the hard disk. The server 1 does not play back the file F directly from the magnetic tape, but plays back the file F seamlessly through the hard disk.

When the file F has been played back, the process returns to (c) and the server 1 continues the process. The once played back file F can be randomly accessed because the file F is left in the cache area of the hard disk until a predetermined time passes. Although not shown, the server 1 deletes even the head part F1 so as to save the recording capacity of the hard disk when a predetermined condition is satisfied, for example, when the access frequency to the head part F1 of the file F left in the cache area of the hard disk is decreased.

As described above, the server 1 accumulates files in the magnetic tape instead of the hard disk, and only the head parts of frequently accessed files are left in the hard disk. Accordingly, the hard disk included in the server 1 does not need to have a large capacity. Also, a high-speed playback can be realized without keeping the user waiting for minutes, which will be required when playback is started from the magnetic tape. Incidentally, the head part of the file may be called beginning of file (BOF).

Next, a case where the server 1 plays back a plurality of files simultaneously will be described. In the server 1, a file is transferred from the hard disk to the magnetic tape for saving (backup) at high-speed, and also a file is transferred from the magnetic tape to the hard disk for restoring at high-speed.

Specifically, since the tape drive unit 20 forming the server 1 is an AIT 2 tape streamer drive, the transfer speed (write/read speed) is 48 Mbps. On the other hand, for example, a video playback speed (real-time speed) of a video file of MPEG 2 format corresponding to a television image quality is about 4 Mbps. That is, a video file is backed up or restored at 12 times the real-time speed. In other words, the video file which is written/read in the magnetic tape for a minute corresponds to a video of 12 minutes.

When the server 1 restores a video file from the magnetic tape to the hard disk and plays back the file at the same time, the server 1 can restore the subsequent part of another video file from the magnetic tape or back up another video file to the magnetic tape during the remaining 11 minutes. That is, the server 1 uses time difference of 11 minutes so that a plurality of different video files are simultaneously and continuously played back in the plurality of client playback apparatuses 3.

Now, a case where the server 1 simultaneously plays back video files FA, FB, and FC will be described with reference to FIGS. 7A to 7C.

As shown in FIG. 7A, the video file FA includes image data A1, A2, . . . , and An, the video file FB includes image data B1, B2, . . . , and Bn, and the video file FC includes image data C1, C2, . . . , and Cn. In the video file FA, the image data A1 is the head part (BOF) of the video file FA. The image data A2 is the subsequent part of the image data A1, the image data A3 is the subsequent part of the image data A2, and the image data An is the subsequent part of the image data An−1. This is the same in the video files FB and FC.

As shown in FIG. 7B, the video files FA, FB, and FC are stored in the different three magnetic tapes #1, #2, and #3, respectively. Each of the video files FA, FB, and FC is sequentially stored. Also, the image data A1, B1, and C1 are stored in the cache area of the hard disk and are not deleted.

FIG. 7C is a time chart when the server 1 simultaneously receives requests for playing back the video files FA, FB, and FC from the client playback apparatuses $3_1$ to $3_3$, respectively. In this time chart, the horizontal axis indicates time (t), and the vertical axis indicates, from the top stage, the time required for writing each image data on the cache area of the hard disk, the time for playing back the video file FA, the time for playing back the video file FB, and the time for playing back the video file FC.

After the playback requests are input to the server 1, the image data A1, B1, and C1 stored in the cache area of the hard disk are simultaneously played back. Also, the following process is performed while the image data A1, B1, and C1 are played back. First, the tape changer 21 selects the magnetic tape #1 in which the image data A2 is written, loading LA2 is performed, that is, the magnetic tape #1 is loaded in the tape drive unit 20. Further, the tape drive unit 20 searches for the position of the image data A2 on the magnetic tape #1 so as to read, and restoring RA2 is performed, that is, the data A2 is transferred to the hard disk. Then, loading LB2 and restoring RB2, and loading LC2 and restoring RC2 are performed with respect to the image data B2 and C2.

The image data A1, B1, and C1 are continuously played back until the above-described process is completed. That is, the capacity of the image data A1, B1, and C1 is ensured in the cache area of the hard disk so that the image data A1, B1, and C1 are continuously played back until the image data A2, B2, and C2 have written on the hard disk.

The same process is repeated so that the video files FA, FB, and FC are simultaneously and continuously played back.

Each of the three video files need not to be written on a different magnetic tape, as shown in FIG. 7B, and may be written on one magnetic tape. Further, each image data of one video file, for example, the image data A1, A2, . . . , and An of the video file FA need not to be sequentially written on the magnetic tape #1, and may be written separately.

Next, a process performed when the server 1 writes a file on the magnetic tape (backup), which has been described with reference to (a) and (b) of FIG. 6, will be described with reference to FIG. 8.

In step S1, when a file is supplied from the client recording apparatus 2, the recording unit 41 stores the file in the cache area of the hard disk in the HDD unit 12.

In step S2, the recording unit 41 determines whether or not the entire file has been stored in the cache area of the hard disk. The process proceeds to step S3 if the entire file has been stored. If the entire file has not been stored, the process is repeatedly performed until the entire file has been stored.

In step S3, the recording unit 41 registers a request of transferring the file from the hard disk to the magnetic tape, that is, a backup request on the schedule-controlling unit 45.

In step S4, the backup unit 43 receives a backup command from the schedule-controlling unit 45 and writes the entire file on the magnetic tape.

Next, a process performed when the server 1 reads a file from the magnetic tape (restoring), which has been described with reference to (c) and (d) of FIG. 6, will be described with reference to FIG. 9.

In step S11, when a request of playing back a file is output from the client playback apparatus 3, the playback unit 42 determines whether or not the entire file (entire data) is stored in the cache area of the hard disk in the HDD unit 12. Herein, a case where the entire file is stored in the cache area of the hard disk means, for example, the time just after the server 1 receives the entire file from the client recording apparatus 2 ((a) of FIG. 6), the time until a predetermined time has passed ((b) of FIG. 6), and the time just after the file is supplied to another client playback apparatus 3 ((e) of FIG. 6). When the entire file is not stored, the process proceeds to step S12. When the entire file is stored, the process proceeds to step S14.

In step S12, the playback unit 42 registers a request for transferring the file from the magnetic tape to the hard disk, that is, a restore request, on the schedule-controlling unit 45.

In step S13, the restoring unit 44 receives a restore command from the schedule-controlling unit 45 and reads data from a partition on the magnetic tape.

In step S14, the playback unit 42 determines whether or not the data to be supplied next has been restored in the cache area of the hard disk. When the data has not been restored, for example, when an error occurs or when there is no BOF data of the file, the process proceeds to step S15. When the next data has been restored, the process proceeds to step S16.

In step S15, the playback unit 42 waits for a predetermined time and returns to step S14 so as to repeat the process.

In step S16, the playback unit 42 supplies the data which has been restored in the cache area of the hard disk to the client playback apparatus 3.

In step S17, the playback unit 42 determines whether or not the entire data (entire file) has been supplied. If the entire data has not been supplied, the process returns to step S14 so as to repeat the process.

Figures 10, 11:
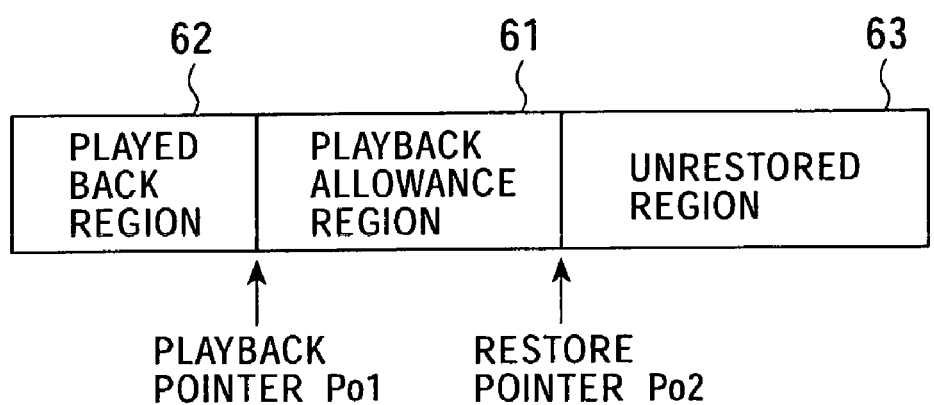
FIG. 10 shows a file transfer table stored in a memory provided in the server.
FIG. 11 illustrates a remaining time for playback used when the server decides the priority of a file.

When the server 1 is operating, a file transfer table 51 shown in FIG. 10 is formed in the memory 15. The file transfer table 51 indicates the file number of files to be transferred and types of transfer request to the schedule-controlling unit 45 (backup request and restore request).

Figure 8:
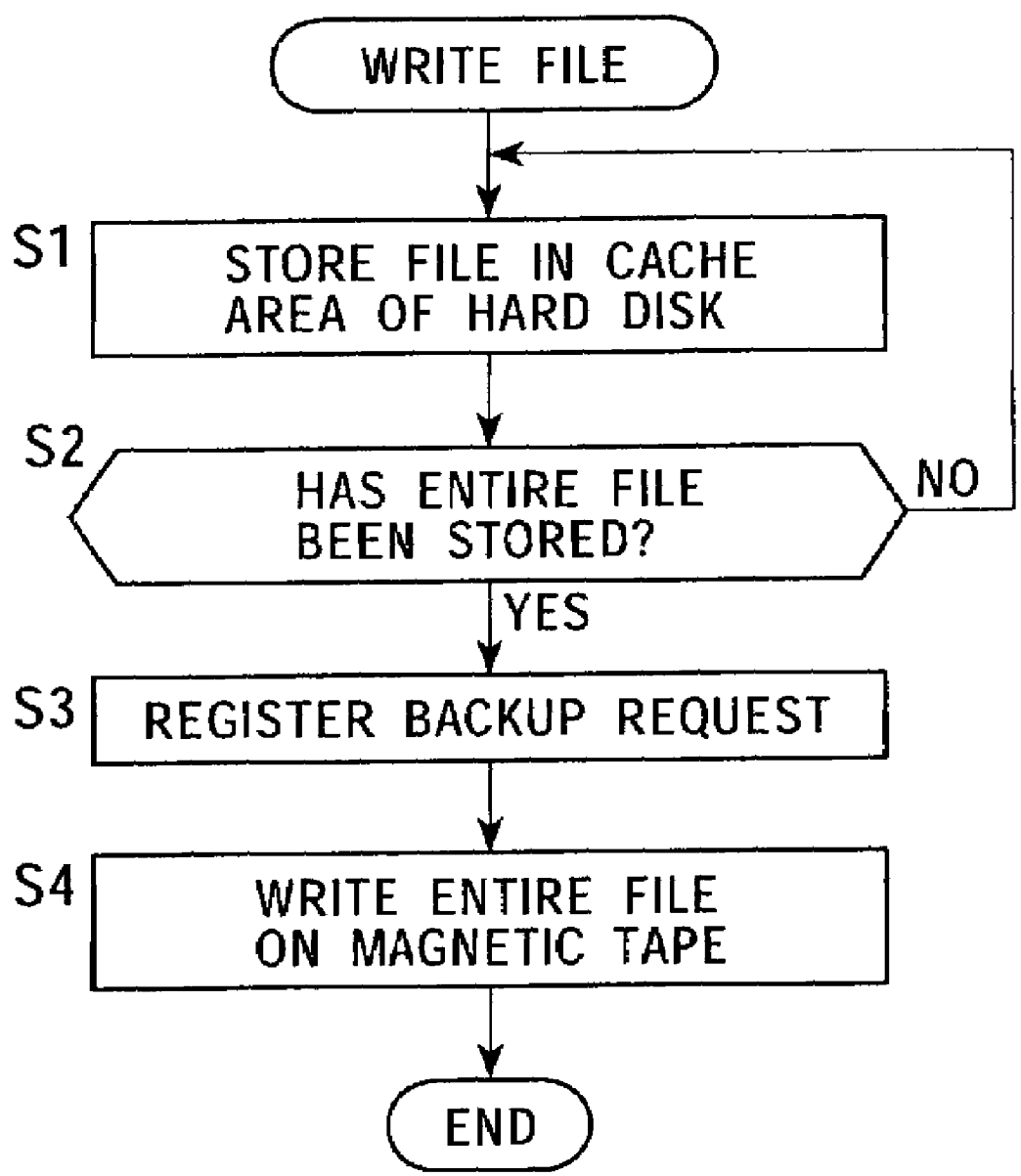
FIG. 8 is a flowchart illustrating a process for backing up a file performed by the server.
Figure 9:
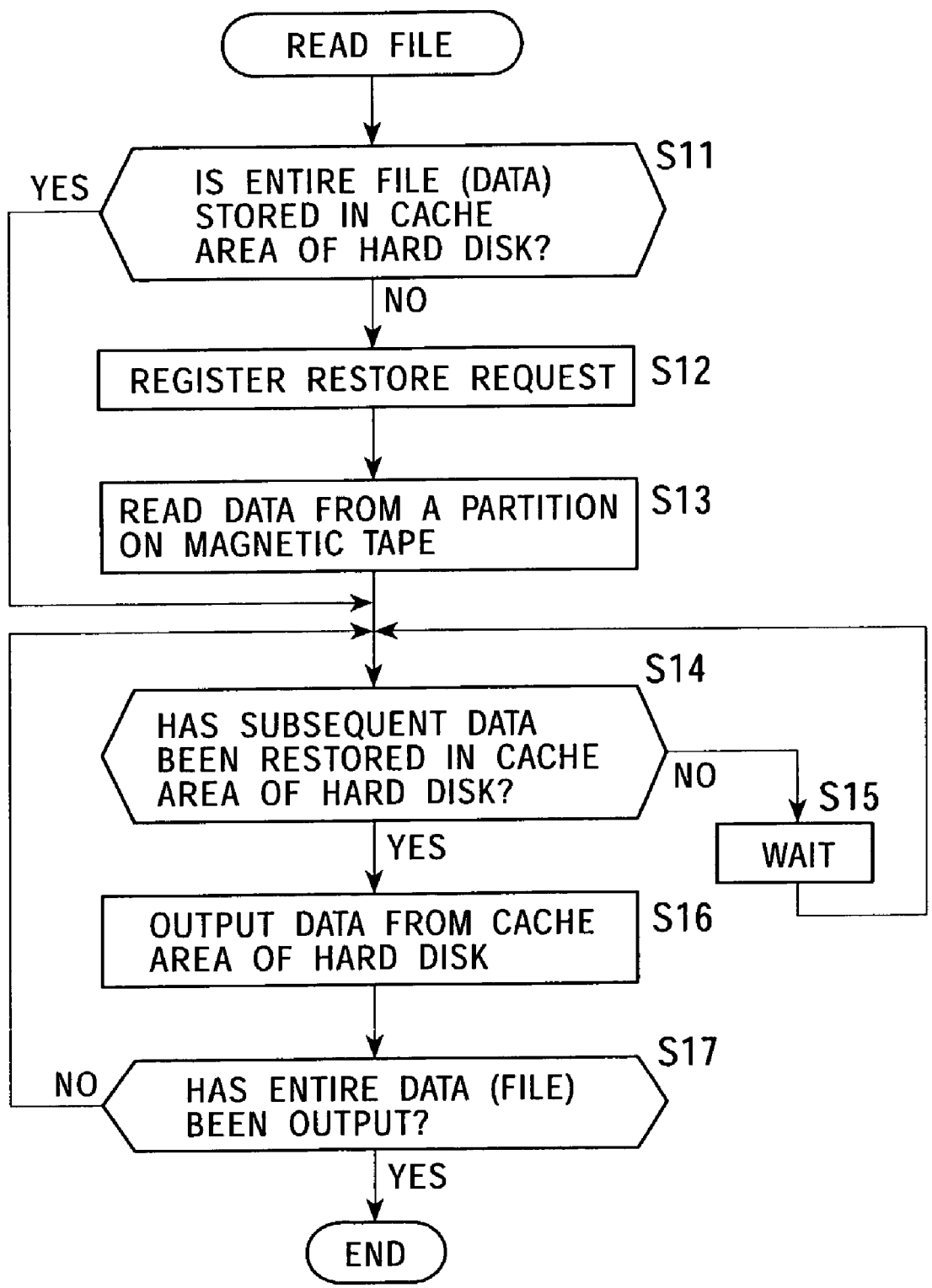
FIG. 9 is a flowchart illustrating a process for restoring a file performed by the server.

That is, the recording unit 41 and the playback unit 42 register a request on the schedule-controlling unit 45 by writing the above-described items on the file transfer table 51 (step S3 of FIG. 8 and step S12 of FIG. 9). The schedule-controlling unit 45 refers to the file transfer table 51 so as to control the backup unit 43 and the restoring unit 44.

Next, the description about the priority of files will follow. When the server 1 allows the plurality of client playback apparatuses 3 to play back a plurality of different files simultaneously, the priority of files should be considered in order to supply the files continuously.

A remaining time for playback for deciding the priority will be described with reference to FIG. 11. When blocks (clusters), which have a predetermined capacity and which form a file stored in the cache area of the hard disk in the HDD unit 12, are aligned in order from the head, a region between a playback pointer Po1 indicating the position of the block being played back and a restore pointer Po2 indicating the position of the block which has been restored is a remaining region for playback 61. Also, the region from the head to the playback pointer Po1 is a played back region 62 and the region from the restore pointer Po2 to the end is an unrestored region 63.

By dividing the capacity (MB) of the remaining region for playback 61 by the real-time speed (Mbps) of a file, time (sec) can be obtained. The time is the remaining time for playback. That is, the remaining time for playback indicates the seconds for which the data of the file stored in the cache area of the hard disk can continue to be played back, that is, the remaining time for playback.

While the server 1 is operating, a remaining time for playback calculation table 71 shown in FIG. 12 is formed in the memory 15. The table 71 shows the file number of the files being played back, the block number indicated by the playback pointer Po1 of the file being played back, and the block number indicated by the restore pointer Po2 of the file being played back. The playback unit 42 writes these items on the table while the file is being played back.

Accordingly, the schedule-controlling unit 45 can find the remaining time for playback of each file by referring to the remaining time for playback calculation table 71. Thus, the schedule-controlling unit 45 regards a file whose remaining time for playback is shorter than a reference time set in advance (threshold) as a high-priority file, and controls the restoring unit 44 so that the data corresponding to one partition which is not restored of the file (hereinafter, referred to as unrestored data) is restored.

In a file system management region formed in the hard disk in the HDD unit 12, a partition access table 72 shown in FIG. 13 is stored. The partition access table 72 indicates partition numbers (#1 to #5099) on the magnetic tapes and the partition number which is subsequently restored/backed up (subsequent partition number).

Herein, when a partition to be subsequently restored/backed up does not exist, that is, when the current partition is the last partition of a file, the subsequent partition is numbered −1. When the subsequent partition is unused, the subsequent partition is numbered −2.

The schedule-controlling unit 45 refers to the partition access table 72 which is temporarily copied from the hard disk to the memory 15 so as to indicate the partition number of the unrestored data to be subsequently restored to the restoring unit 44.

Also, when a file whose remaining time for playback is shorter than the reference time does not exist, that means all files have a remaining region for playback. In this case, the schedule-controlling unit 45 determines the priority of files by using a distance parameter instead of using a remaining time for playback.

The distance parameter will be described with reference to FIG. 14. Herein, the magnetic tape #1 is loaded in the tape drive unit 20, and the other magnetic tapes #2 to #20 are accommodated in the rack unit of the tape changer unit 21. FIG. 14 shows the layout of the magnetic tape #1 and the layout of the magnetic tape #2 among the magnetic tapes #2 to #20.

In the magnetic tape #1, the start position of the partition which is currently read by the tape drive unit 20, that is, the partition which is scanned by the head unit (not shown) of the tape drive unit 20 is a current position P1. Also, in the magnetic tape #2, the position of the partition which was last scanned by the head unit before the magnetic tape #2 is removed from the tape drive unit 20, that is, the start position of the partition which is read first when the magnetic tape #2 is loaded in the tape drive unit 20 is an unload position P2.

The number given to each partition of the magnetic tapes #1 and #2 shown in FIG. 14 is a distance parameter indicating the distance between the current position P1 to each partition. That is, in the magnetic tape #1, the distance parameter of the partition whose start position is indicated by the current position P1 is 1. The distance parameters of other partitions are 2, 3, 4, . . . in accordance with the distance from the current position P1. On the other hand, in the magnetic tape #2, the time until the magnetic tape #2 is loaded in the tape drive unit 20 should be considered, and thus an extra 10 is added as an offset value. Accordingly, the distance parameter of the partition whose start position is indicated by the unload position P2 is 11, and the distance parameters of other partitions are 12, 13, 14, . . . in accordance with the distance from the unload position P2.

The schedule-controlling unit 45 decides the priority of files based on the distance parameter. That is, the schedule-controlling unit 45 regards a file whose distance parameter of partition is low as a high-priority file, and controls the restoring unit 44 so that the data of the partition is restored in the unrestored region 63.

In the file system management region formed in the hard disk in the HDD unit 12, an unload position table 73 shown in FIG. 15 is stored. The unload position table 73 indicates magnetic tape numbers (#1 to #20) and the partition number or the partition whose start position is indicated by the unload position P2 of each magnetic tape.

Herein, in a magnetic tape currently loaded in the tape drive unit 20, the partition number of the unload position P2 is −1, for example.

Accordingly, the schedule-controlling unit 45 refers to the unload position table 73 which is temporarily copied from the hard disk to the memory 15 so as to check the unload position P2 of each magnetic tape. Then, the schedule-controlling unit 45 regards a file whose distance parameter of the partition of the unrestored data to be subsequently restored is the lowest as a high-priority file, and controls the restoring unit 44 so that the unrestored data is restored.

Figure 16:
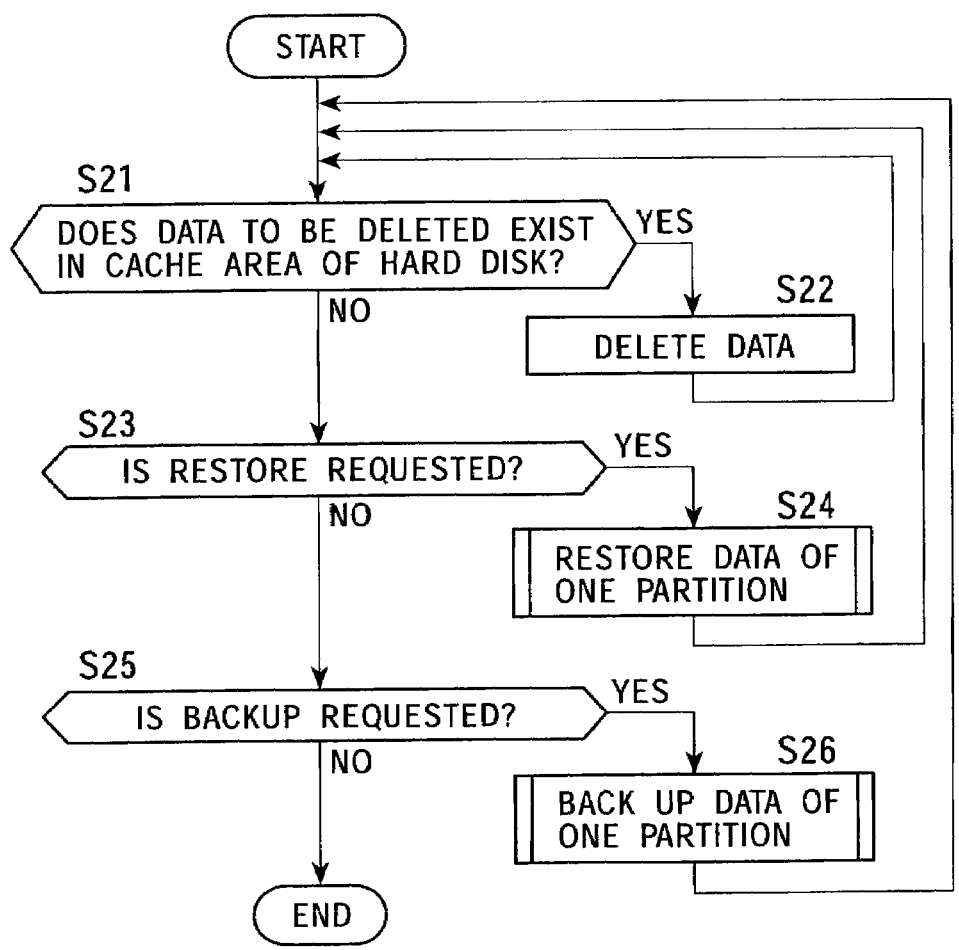
FIG. 16 is a flowchart illustrating a process performed by a schedule-controlling unit which forms an integration file system management.

Next, the process performed by the schedule-controlling unit 45 will be described with reference to FIG. 16. In step S21, the schedule-controlling unit 45 checks whether or not data to be deleted exists in the cache area of the hard disk in the HDD unit 12. The process proceeds to step S22 if data to be deleted exists, and the process proceeds to step S23 if data to be deleted does not exist.

In step S22, the schedule-controlling unit 45 deletes the data stored in the cache area of the hard disk, that is, releases the block on which data is written in the cache area. Then, the process returns to step S21 so as to continue the process.

In step S23, the schedule-controlling unit 45 checks whether or not a restore is requested by referring to the file transfer table 51 stored in the memory 15. The process proceeds to step S24 if a restore is requested and the process proceeds to step S25 if a restore is not requested.

In step S24, the schedule-controlling unit 45 controls the restoring unit 44 so that the data of one partition of the file which is requested to be restored is restored. After that, the process returns to step S21 so that the process is continued. The restoring of the data of one partition will be described later with reference to FIG. 17.

In step S25, the schedule-controlling unit 45 checks whether or not a backup is requested by referring to the file transfer table 51 stored in the memory 15. The process proceeds to step S26 if a backup is requested, and the process is completed if a backup is not requested.

In step S26, the schedule-controlling unit 45 controls the backup unit 43 so that the data of one partition of the file which is requested to be backed up is backed up. After that, the process returns to step S21 so that the process is continued. The backup of the data of one partition will be described later with reference to FIG. 18.

As described above, the schedule-controlling unit 45 puts priority on checking whether or not a restore is requested rather than on checking whether or not a backup is requested. This is because the data written on the cache area of the hard disk may be backed up during a so-called idle time, that is, when the server 1 does not perform a playback process. That is, a backup is not as temporally limited as a restore. Accordingly, the server 1 can put priority on continuously playing back a file.

Figure 17:
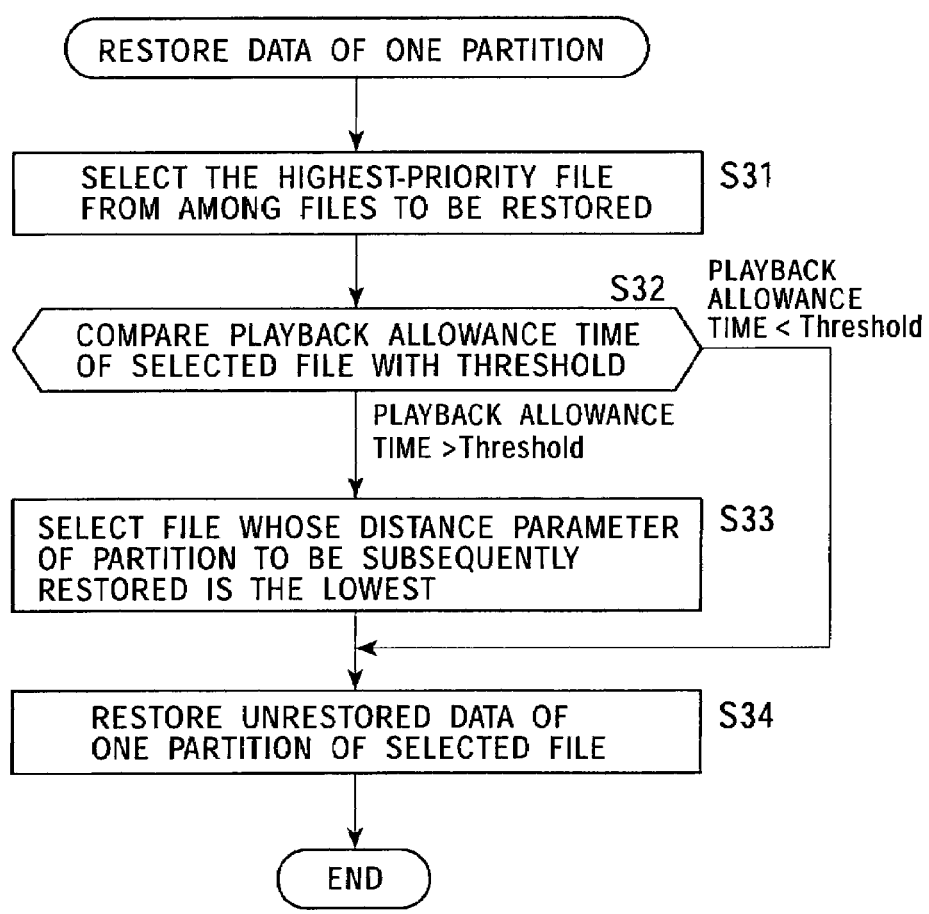
FIG. 17 is a flowchart illustrating a process of restoring data of one partition.

Next, a process of restoring the data of one partition described in step S24 in FIG. 16 will be described in detail with reference to FIG. 17.

In step S31, the schedule-controlling unit 45 selects the highest-priority file, that is, the file having the shortest remaining time for playback from among the files to be restored which are written on the file transfer table 51, by referring to the remaining time for playback calculation table 71.

In step S32, the schedule-controlling unit 45 compares the remaining time for playback of the selected file with the reference time, which is set in advance. The process proceeds to step S33 if the remaining time for playback is longer than the reference time, and the process proceeds to step S34 if the reference time is longer than the remaining time for playback.

In step S33, since the selected file has a remaining region for playback, the schedule-controlling unit 45 determines the partition of the unrestored data to be subsequently restored by referring to the partition access table 72 from among the files to be restored, and then selects the file whose distance parameter of the partition is the lowest by referring to the unload position table 73.

In step S34, the restoring unit 44 restores the unrestored data of one partition of the file selected by the schedule-controlling unit 45.

Figure 18:
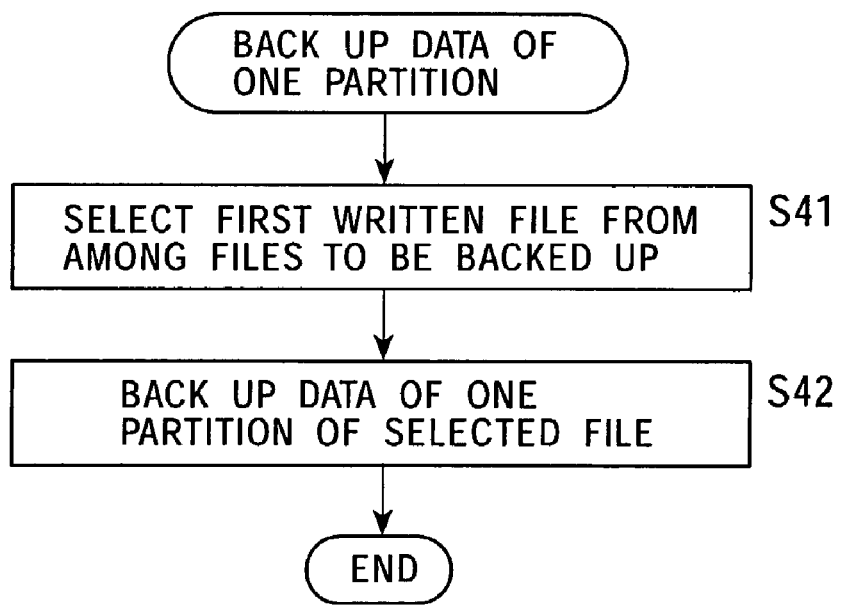
FIG. 18 is a flowchart illustrating a process of backing up data of one partition.

Subsequently, a process of backing up the data of one partition described in step S26 of FIG. 16 will be described in detail with reference to FIG. 18.

In step S41, the schedule-controlling unit 45 selects the first written file from among the files to be backed up written on the file transfer table 51.

In step S42, the backup unit 45 backs up the data of one partition which is not yet backed up of the file selected, by the schedule-controlling unit 45.

As described above, the server 1 according to the embodiment can allow the plurality of client playback apparatuses 3 to simultaneously and continuously play back a plurality of different files whose part or entire part is written on only the magnetic tape, that is, a plurality of different files which are deleted from the hard disk in the HDD unit 12 and which are backed up in the magnetic tape.

Also, when a file whose remaining time for playback is shorter than the reference time is not written on the magnetic tape, the server 1 restores the partitions in the hard disk in order from the partition whose distance parameter is the lowest. Thus, the time required for restoring all partitions can be shortened. Further, since the server 1 restores the partitions in the hard disk in order from the partition whose distance parameter is the lowest, the number of moves (rubbing) of the magnetic tape can be reduced. Thus, the durability of the magnetic tape can be increased.

The present invention is not limited to the above-described embodiment, and various modifications can be possible without deviating from the scope of the present invention.

For example, in the above-described embodiment, the tape drive unit 20 provided in the server 1 is a so-called AIT 2 tape streamer drive. However, any tape streamer drive may be used as long as a multi-partition function is provided therein.

Also, an SCSI is used as the interface for connecting the control unit 11 and the tape drive unit 20 in the server 1. However, an ATA may be also used as the interface. Further, an RS-232C serial interface is used as the interface for connecting the control unit 11 and the tape changer unit 21 in the server 1. However, an SCSI may be also used as the interface.

What is claimed is:

1. A recording and playback apparatus comprising:
   magnetic tape drive means for reading/writing a data file including a plurality of data in units of recording regions which are formed by dividing a magnetic tape in each of a plurality of tape cartridges, each recording region having a predetermined capacity;
   tape cartridge changing means for accommodating the plurality of tape cartridges including a plurality of data files, selecting a specific tape cartridge from among the plurality of tape cartridges, and conveying the selected tape cartridge to the magnetic tape drive means;
   hard disk drive means including a hard disk having at least a cache area which is used when the magnetic tape drive means reads/writes said plurality of data files, said hard disk drive means storing at least one recording region of each data file of said plurality of data files representing the beginning of said each data file in the cache area of said hard disk,
   wherein when said plurality of data files is requested to be played back substantially simultaneously, said hard disk drive means accesses said at least one recording region of each data file while remaining recording regions of said each data file are subsequently written on the cache area of said hard disk; and
   control means including at least a schedule-controlling unit which selects a data file whose remaining time for playback is the shortest when a plurality of different data files on the magnetic tapes in the plurality of tape cartridges are played back while the data files are sequentially written on the cache area of the hard disk, the remaining time for playback being calculated based on a currently played back position and a writing end position in the cache area on which data of a predetermined number of recording regions is written,
   wherein said scheduling-controlling unit causes said plurality of different data files to be playback in order from the data file whose remaining time for playback is the shortest to a data file whose remaining time for playback is the longest.

2. The recording and playback apparatus according to claim 1, wherein the schedule-controlling unit calculates the remaining time for playback based on the capacity of a remaining region for playback between the currently played back position and the writing end position.

3. The recording and playback apparatus according to claim 1, wherein the schedule-controlling unit compares the remaining time for playback of the selected data file with a predetermined reference time, and, when the remaining time for playback is shorter than the reference time, the schedule-controlling unit performs control so that the data of one recording region of the selected data file is written on the cache area.

4. The recording and playback apparatus according to claim 1, further comprising storage means for storing at least an information table in which the currently played back position and the writing end position are associated with each of the data files.

5. The recording and playback apparatus according to claim 1, wherein the schedule-controlling unit compares the remaining time for playback of the selected data file with a predetermined reference time, and, when the remaining time for playback is longer than the reference time, the schedule-controlling unit again selects a data file based on the distance between the recording region which is currently read by the magnetic tape drive means and each of the recording regions forming the plurality of magnetic tapes except the currently read recording region.

6. The recording and playback apparatus according to claim 5, wherein the schedule-controlling unit sets for all recording regions a parameter for indicating the distance between the recording region which is currently read by the magnetic tape drive means and each of the recording regions, and selects the data file in which the parameter of the recording region to be subsequently read is the lowest.

7. A recording and playback method using a recording and playback apparatus comprising magnetic tape drive means for reading/writing a data file including a plurality of data in units of recording regions which are formed by dividing a magnetic tape in each of a plurality of tape cartridges, each recording region having a predetermined capacity; tape cartridge changing means for accommodating the plurality of tape cartridges including a plurality of data files, selecting a specific tape cartridge from among the plurality of tape cartridges, and conveying the selected tape cartridge to the magnetic tape drive means; and hard disk drive means including a hard disk having at least a cache area which is used when the magnetic tape drive means reads/writes said plurality of data files, the method comprising:
   storing at least one recording region of each data file of said plurality of data files representing the beginning of said each data file in the cache area of said hard disk,
   wherein when said plurality of data files is requested to be played back substantially simultaneously, said hard disk drive means accesses said at least one recording region of each data file while remaining recording regions of said each data file are subsequently written on the cache area of said hard disk; and
   selecting a data file whose remaining time for playback is the shortest when a plurality of different data files on the magnetic tapes in the plurality of tape cartridges are played back while the data files are sequentially written on the cache area of the hard disk, the remaining time for playback being calculated based on a currently played back position and a writing end position in the cache area on which data of a predetermined number of recording regions is written,
   wherein said scheduling-controlling unit causes said plurality of different data files to be playback in order from the data file whose remaining time for playback is the shortest to a data file whose remaining time for playback is the longest.

8. The method according to claim 7, further comprising calculating the remaining time for playback based on the capacity of a remaining region for playback between the currently played back position and the writing end position.

9. The method according to claim 7, further comprising comparing the remaining time for playback of the selected data file with a predetermined reference time, and, when the remaining time for playback is shorter than the reference time, performing control so that the data of one recording region of the selected data file is written on the cache area.

10. The method according to claim 7, further comprising storing an information table in which the currently played back position and the writing end position are associated with each of the data files.

11. The method according to claim 7, further comprising comparing the remaining time for playback of the selected data file with a predetermined reference time, and, when the remaining time for playback is longer than the reference time, selecting again a data file based on the distance between the recording region which is currently read by the magnetic tape drive means and each of the recording regions forming the plurality of magnetic tapes except the currently read recording region.

12. The method according to claim 11, further comprising setting for all recording regions a parameter for indicating the distance between the recording region which is currently read by the magnetic tape drive means and each of the recording regions, and selecting the data file in which the parameter of the recording region to be subsequently read is the lowest.

* * * * *